United States Patent

Verbunt et al.

[11] Patent Number: 6,018,442
[45] Date of Patent: Jan. 25, 2000

[54] RECORDING AND/OR REPRODUCING APPARATUS HAVING ROTARY SCANNING DRUM SUPPORTED BY A BEARING HAVING CONTACTING BEARING SURFACES WHICH PROVIDE ELECTRICAL GROUNDING

[75] Inventors: Johannes P. M. Verbunt, Eindhoven, Netherlands; Josef Neges, Vienna, Austria

[73] Assignee: U.S. Philips Corporation, New York, N.Y.

[21] Appl. No.: 09/052,294

[22] Filed: Mar. 31, 1998

[30] Foreign Application Priority Data

Apr. 4, 1997 [EP] European Pat. Off. .............. 97200985

[51] Int. Cl.[7] .............................. G11B 5/52; G11B 17/02
[52] U.S. Cl. ........................ 360/107; 360/84; 360/96.2; 360/96.4; 360/98.07; 360/99.08; 242/354
[58] Field of Search ....................... 360/84, 97.01–98.01, 360/93.95, 96.3, 96.2, 96.4, 98.07, 99.08, 107, 130.24; 242/354

[56] References Cited

U.S. PATENT DOCUMENTS

| | | | |
|---|---|---|---|
| 3,833,924 | 9/1974 | Okabe | 360/107 |
| 4,238,088 | 12/1980 | Schoettle et al. | 242/352.3 |
| 4,276,575 | 6/1981 | Schoettle et al. | 360/130.21 |
| 5,019,926 | 5/1991 | Van Thuijl et al. | 360/84 |
| 5,325,248 | 6/1994 | Tabuchi et al. | 360/84 |
| 5,328,271 | 7/1994 | Titcomb | 360/99.12 |
| 5,442,506 | 8/1995 | Kang | 360/107 |
| 5,486,966 | 1/1996 | Ahn | 360/107 |
| 5,506,459 | 4/1996 | Ritts | 310/90.5 |
| 5,734,530 | 3/1998 | Kim | 360/107 |
| 5,801,900 | 9/1998 | Elsaesser et al. | 360/98.07 |

FOREIGN PATENT DOCUMENTS 8014250 6/1994 Japan .

Primary Examiner—Jefferson Evans
Attorney, Agent, or Firm—Leroy Eason

[57] ABSTRACT

An apparatus having a read/write head for reading and/or writing information on an information carrier which may be in the form of a tape or disc. The head is mounted on a drum which is supported on a shaft which axially rotates the drum so as to move the head relative to the information carrier, which in the case of a tape winds around the drum. The drum is supported in the axial direction by a thrust bearing and in the radial direction by fluid bearings (25) and (26). The thrust bearing has adjoining surfaces of which at least one is made of cemented tungsten carbine, the other possibly being of steel. Thus, there is low friction and low wear. During operation of the apparatus the bearing surfaces remain in contact, thereby forming an electrical coupling to a grounding frame of the apparatus so as to limit static charging of the rotating drum.

10 Claims, 3 Drawing Sheets

RECORDING AND/OR REPRODUCING APPARATUS HAVING ROTARY SCANNING DRUM SUPPORTED BY A BEARING HAVING CONTACTING BEARING SURFACES WHICH PROVIDE ELECTRICAL GROUNDING

BACKGROUND OF THE INVENTION

1. Field of the Invention

The invention relates to an apparatus for recording and/or reproducing information on an information carrier comprising

- a head for reading and/or writing information from/on the information carrier,
- a rotatable member for moving the head and the information carrier relative to each other,
- a bearing for supporting said rotatable member relative to a frame so as to allow rotation of the rotatable member round an axis of rotation,
- a ground system comprising an electrical coupling between the rotatable member and a fixed terminal to limit static charging of the rotatable member,
- the bearing comprising bearing surfaces co-operating with each other for positioning the rotatable member in axial direction relative to the frame.

2. Description of the Related Art

Such an apparatus is known from U.S. Pat. No. 5,019,926. The known apparatus comprises a magnetic-head drum system comprising a lower drum which is fixedly connected to a frame and an upper drum carrying magnetic heads. The tipper drum is supported by a shaft which is fixedly connected to the lower drum and the upper drum is rotatable round an axis of rotation defined by the shaft. The shaft is formed with pump grooves to form a radial helical-groove bearing which supports the upper drum in the radial direction. At the upper end of the shaft a thrust-bearing plate is arranged which is also formed with pump grooves and which is connected to the upper drum. The upper end of the shaft and the thrust-bearing plate form an axial helical-groove bearing to position the upper drum in the axial direction relative to the lower drum. Further, the known apparatus comprises a bridge construction which carries a ground spring which near its free end is connected to a pressure member. The spring presses the pressure member against a surface of the thrust-bearing member, which surface is opposite the bearing surface facing the shaft. During rotation of the upper drum the pressure member and the thrust-bearing plate are in sliding contact thereby enabling static charge built up oil the upper drum to be discharged via the ground spring.

A disadvantage of the known apparatus is that the sliding contact between the pressure member and the thrust-bearing plate cause vibrations in the ground spring which contribute to the sound level produced by the apparatus and ineffective contact quality because of a limited contact press force.

SUMMARY OF THE INVENTION

It is an object of the invention to provide an apparatus in which said disadvantage is mitigated. Thereto the apparatus according to the invention is characterised in that,

- during rotation of the rotatable member said bearing surfaces are in contact with each other,
- at least one of the bearing surfaces comprises tungsten carbide and that
- said electrical coupling between the rotatable member and the frame is formed by the contacting bearing surfaces.

With these measures two functions can be fulfilled with one pair of surfaces. One of these functions is supporting the rotatable member in the axial direction. The other function is providing an electrical coupling between the rotatable member and the frame. In the known apparatus a fluid is pumped between the co-operating surfaces of the bearing so that the bearing surfaces are not in contact with each other, which results in a poor electrical coupling. The electrical coupling is instead obtained by a carbon element contacting a metal surface. However, carbon is not well suited to form a bearing because it has high wear. Also, it has been found that most hard materials do not result in a satisfactory ground system. Surprisingly, it has been found that with the measures according to the invention, the static charge on the rotatable member is limited such that spark discharges are counteracted in a satisfactory way and at the same time the bearing has a low wear. Due to this double function of the bearing, the ground spring can be dispensed with and the sound level produced by the apparatus is reduced.

An embodiment of the apparatus according to the invention is characterised in that the at least one bearing surface comprises an alloy of tungsten carbide and cobalt. An alloy of tungsten carbide and cobalt has the advantage that it has a low electrical resistivity (about 15–20 micro Ohm.cm) and has, because of its hardness and small grain size, excellent mechanical properties such as fracture toughness, weldability and corrosion resistance.

An embodiment of the apparatus according to the invention is characterised in that the at least one bearing surface comprises an alloy of 90–97% tungsten carbide and 10–3% cobalt. It has been found that these ranges have the additional advantage that the bearing is able to withstand high accelerations which result from mechanical shocks during transport of the apparatus.

An embodiment of the apparatus according to the invention is characterised in that the at least one bearing surface is formed by cemented tungsten carbide grains with an average diameter in the range of 0.3 to 1.2 micrometer. It has been found that this range results in a low wear and a good electrical coupling. Small grains also result in small pores and less material flawes.

An embodiment of the apparatus according to the invention is characterised in that one bearing surface is substantially flat and that the other bearing surface is a convex surface which is rotational symmetric round said axis of rotation. Due to these measures the bearing surfaces contact each other near the axis of rotation so that their relative speed is minimised which results in a low friction and a low wear of the bearing resulting in a minimised axial run-out of the rotatable member. In addition, the contact surface is very small so that the bearing surfaces contact each other during rotation at forces which are normally impeded on the bearing in the axial direction.

An embodiment of the apparatus according to the invention is characterised in that the bearing comprises a hydrodynamic fluid bearing for supporting the rotatable member in the radial direction. Due to this measure the axis of rotation is held in a stable position resulting in a low wear of said bearing surfaces and a low radial run-out of the rotatable member. The non-conductivity of the hydrodynamic bearing is no problem as the bearing for positioning the rotatable member in the axial direction is conductive.

An embodiment of the apparatus according to the invention is clharacterised in that said bearing surfaces are provided with oil. As is well known in the art, oil enhances the lifetime of the bearing. It has been found that the electrical contact is still sufficient to prevent spark discharges when oil is used.

An embodiment of the apparatus according to the invention is characterised in that the oil comprises ether oil. Ether oil has the advantage that it is very stable under high pressure and in a large temperature range.

An embodiment of the apparatus according to the invention is characterised in that the at least one bearing surface has a surface roughness Ra between 0.008 and 0.05 micrometer. This measure results in a stable axial position of the rotatable member during lifetime. For example when the rotatable member is a rotary drum for helical scanning a tape-shaped information carrier the axial position of the drum is critical as it defines the position of the information tracks on the tape-shaped information carrier. By this measure, the tracks are read or written at a constant position so that compatibility with other apparatuses is assured. When the surface roughness is smaller than 0.008 micrometer the electrical coupling is not adequate to prevent spark discharges, because in that case a lubricating film separates the bearing surfaces and there is no contact.

An embodiment of the apparatus according to the invention is characterised in that the rotatable member is a rotary drum for helical scanning a tape-shaped information carrier. When a rotary drum is used to scan a tape-shaped information carrier, the relative movement of the drum and the information carrier causes the rotary drum to be statically charged very quickly because of friction between the tape and tape guiding surfaces. Also, the tape may be charged because of such friction during an earlier use. The static charge may result in spark discharges which corrupt the information read or written from/on the information carrier. Therefore, a first requirement is that spark discharges are prevented. As indicated above, the axial position of such a rotary drum must be kept within a small range during the whole lifetime of the apparatus. Therefore, a second requirement is that the axial bearing shows very little wear. In the past, all rotary drum apparatuses had separate provisions to meet this first and second requirement. A separate ground system was believed to be a 'sine qua non' for proper operation of such apparatuses. It is the merit of the invention to leave that thinking and to provide a single and simple solution which meets this first and second requirement.

An embodiment of the apparatus according to the invention is characterised in that the rotatable member is a capstan for driving a tape-shaped information carrier. Due to the contact between the capstan and the tape-shaped information carrier, the capstan also tends to build up static charge which may result in disturbing spark discharges. Such a capstan may be supported in the radial direction by a sleeve bearing which is usually lubricated so that it does not provide an adequate electrical coupling. With the measures according to the invention the axial bearing surfaces can provide adequate electrical coupling and have a low wear.

An embodiment of the apparatus according to the invention is characterised in that the rotatable member is a hub for driving a disc-shaped information carrier. A disc-shaped information carrier may also be charged with static electricity due to its rotation. Additionally, a disc-shaped information carrier requires a low vibration level so that the measures according to the invention can provide a substantial advantage because a ground spring can be dispensed with. Preferably, the measures according to the invention are combined with a helical-groove bearing in order to obtain very small, so called, nonrepetitive run out errors.

BRIEF DESCRIPTION OF THE DRAWINGS

Embodiments of the invention are represented in the drawings and will be further described hereafter, in which drawings.

DESCRIPTION OF THE PREFERRED EMBODIMENTS

Figure 1:
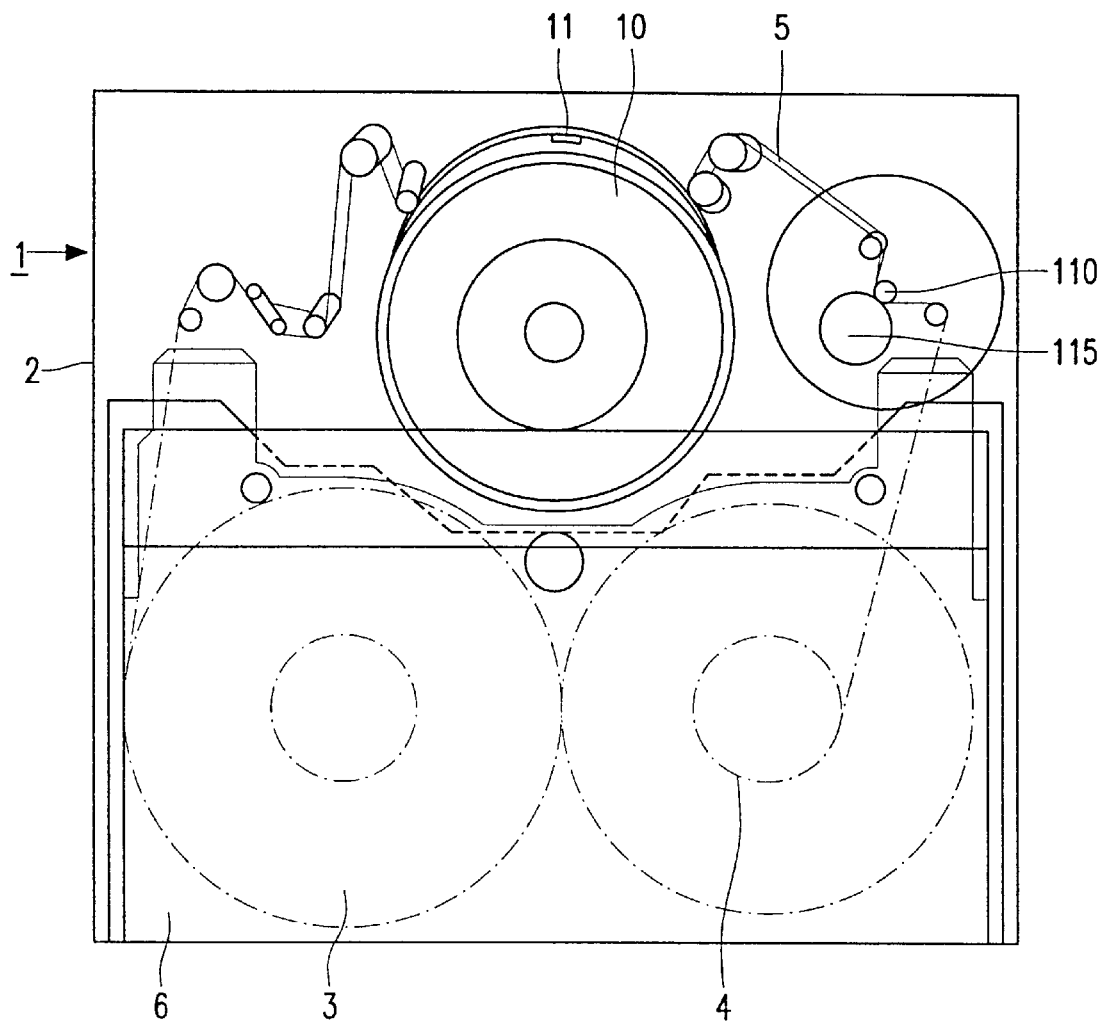
FIG. 1 shows a top view of an embodiment of the apparatus according to the invention.

FIG. 1 shows a top view of an embodiment of the apparatus according to the invention. The apparatus 1 comprises a magnetic head 11 for reading and/or writing information from/on a information carrier in the form of a magnetic tape 5. The head 11 is mounted on a rotatable drum 10 for moving the head 11 relative to the information carrier 5 which is wound around the drum 10. The drum 10 can be driven by a motor (see FIG. 2) relative to a frame 2 of the apparatus 1. A capstan 110 (see FIG. 3) and a roller 115 are provided to move the tape 5 relative to the drum 10 and the head 11. The tape 5 is wound on two spools 3 and 4 in a cassette 6. By moving the tape 5 past the drum and rotating the drum 10 at the same time, the magnetic head 11 scans oblique tracks on the tape 5 and can read and/or write information, for example video signals, on/from the tape 5.

Figure 2:
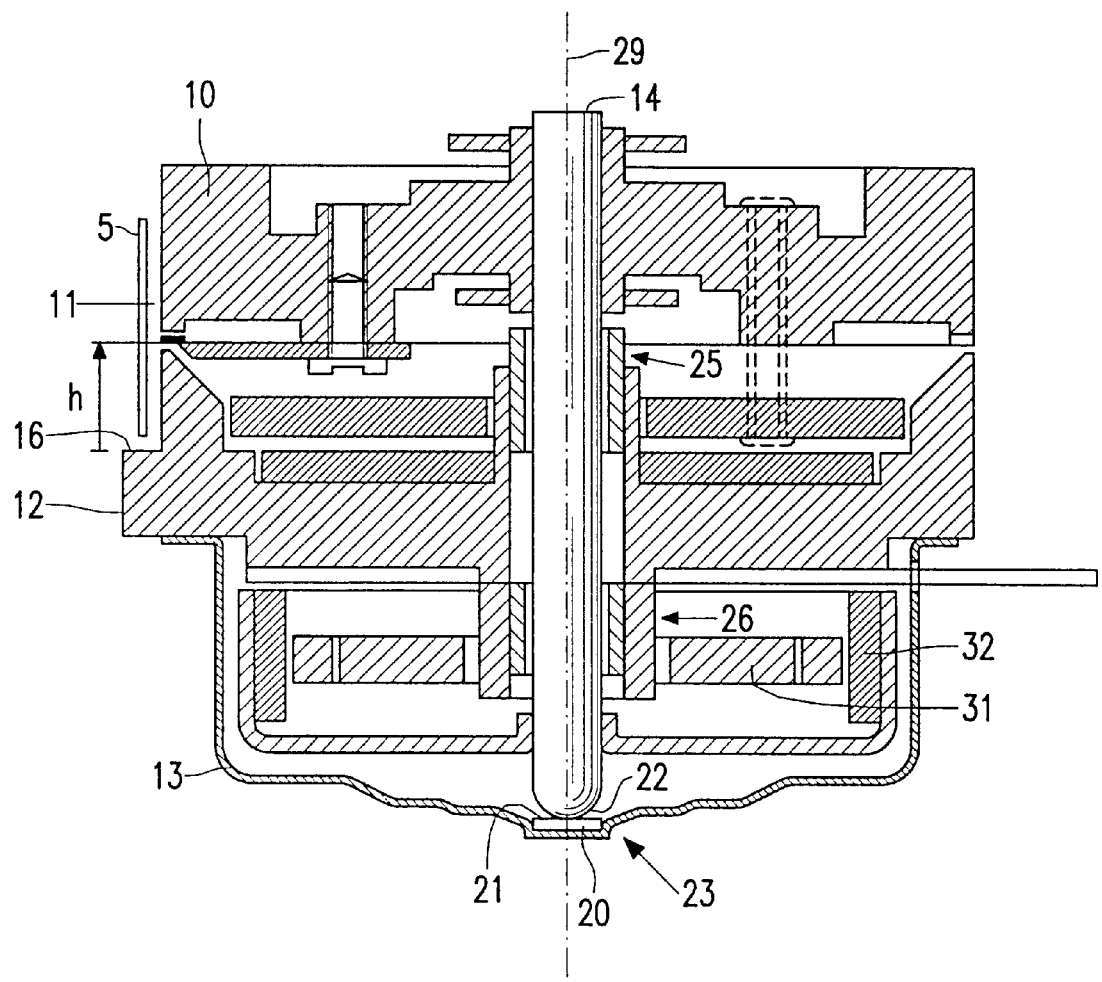
FIG. 2 shows a cross-sectional view of a helical-scanning unit.

FIG. 2 shows a cross-sectional view of a helical-scanning unit comprising the rotatable drum 10 shown in FIG. 1 and a fixed drum 12. The helical-scanning unit further comprises a shaft 14 which is fixed to the rotatable drum 10. The shaft is supported in the radial direction by fluid bearings 25 and 26 and supported in the axial direction by a thrust bearing 23. The rotatable drum 10 can be driven by an electric motor formed by a coil 31 mounted on fixed drum 12 and a permanent magnet 32 mounted on the shaft 14. When the drum 10 is rotated, the magnetic head 11 mounted on the drum 10 scans the magnetic tape 5 along a certain track. The position of this track is determined by the height h of the magnetic head 11 relative to a tape support 16 on the fixed drum 11.

The thrust bearing 23 comprises a flat bearing surface 21 of a thrust plate 20 and a convex end 22 of the shaft 14. The surfaces 21 and 22 co-operate with each other to position the rotatable drum 10 in the axial direction relative to the fixed drum. The thrust plate 20 is made of cemented tungsten carbide and the shaft 14 is made of steel so that the bearing 23 shows low friction and low wear.

During rotation of the rotatable member 10 the bearing surfaces 21 and 22 contact each other and, because of the electrical conductivity of steel and the cemented tungsten carbide, thereby form an electrical coupling. The steel shaft, the bearing 23 and a metal cap 13 carrying the thrust plate 20, form a ground system which limits static charging of the rotatable drum 10.

Preferably, the thrust plate 20 is made by sintering a mixture of 90–97% tungsten carbide powder and 10–3% cobalt powder. It has been found that an electrical coupling with a resistance below 1 kOhm and a low wear can be obtained when using 3% by weight of cobalt and an average grain size of 0.8 micrometer or when using 6% by weight of cobalt and an average grain size of 0.5 micrometer. With these parameters the bearing surface 21 had a hardness larger than 2000 HV.

In order to have a low friction and a low wear, the bearing surface 21 is substantially flat and the other bearing surface 22 is a convex surface which is rotational symmetric around said axis of rotation 20. The bearing surface 21 has been polished so as to reach a surface roughness of about 0.01 micrometer. It has been found that a surface roughness of less than 0.008 micrometer results in a poor electrical coupling and that a surface roughness of more than 0.05 micrometer results in an excessive wear of the bearing 23. The friction and wear can further be reduced by providing the bearing surfaces 21 and 22 with a small amount of ether oil. As the bearing surfaces 21 and 22 are pressed on each other due to the weight of the shaft 14 and the rotatable drum 10 the oil does not prevent an electrical coupling.

Figure 3:
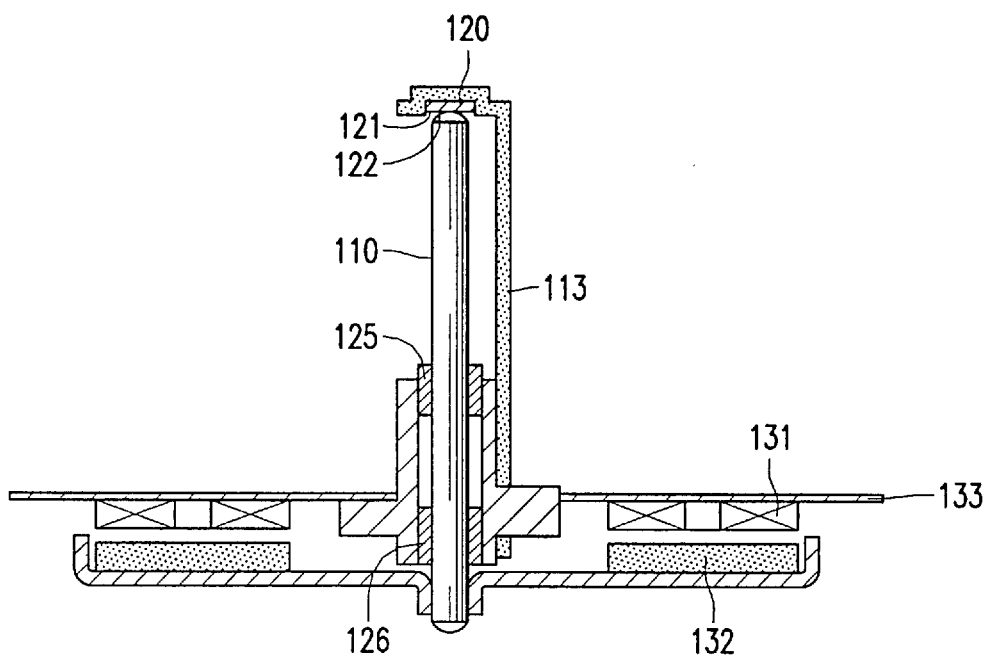
FIG. 3 shows a cross-sectional view of a capstan unit and FIG. 4 shows a schematic view of a disc drive.

FIG. 3 shows a cross-sectional view of a capstan unit suitable for driving a tape-shaped information carrier in an apparatus as shown in FIG. 1. The capstan unit comprises a capstan 110 which is supported in the radial direction relative to a metal frame 133 by means of sleeve bearings 125 and 126. The capstan 110 is drivable by means of an electric motor formed by a set of coils 131 and a permanent magnet 132. The capstan 110 is positioned in the axial direction by a thrust bearing plate 120 which contacts the upper end face 122 of the capstan 110 with a bearing surface 121. The end face 122 of the capstan 110 is pressed against the bearing surface 121 by magnetic forces between the permanent magnet 132 and the metal frame 133. The thrust bearing plate 120 comprises tungsten carbide so that static charge loaded on the capstan 110 is discharged by a ground system comprising the electrical coupling of the surfaces 121 and 122, a conductive support member 113 and the metal frame 133.

Figure 4:
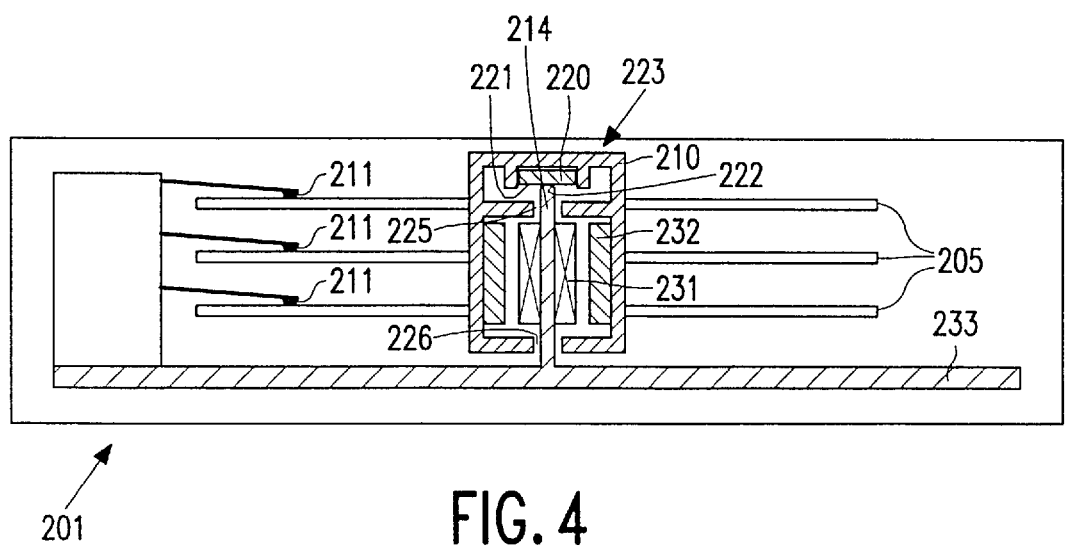

FIG. 4 shows a schematic view of a disk drive. The disc drive 201 comprises a hub 210 for driving a set magnetic disks 205. Information can be read and written from/on the disks 205 by means of magnetic heads 211. The disk drive comprises a shaft 214 which is fixed to a chassis 233. The hub 210 is supported relative to the shaft 214 in the radial direction by fluid bearings 225 and 226 and is supported in the axial direction by a thrust bearing 223. The hub 210 can be driven by an electric motor formed by a coil 231 mounted on the shaft 214 and a permanent magnet 232 mounted on the hub 210.

The thrust bearing 223 comprises a bearing surface 221 of a thrust plate 220 which is connected to the hub 210 and a convex end 222 of the shaft 214. The thrust plate 220 is made of cemented tungsten carbide and the shaft 214 is made of steel so that the bearing 23 shows low friction and low wear and so that static charge loaded on the hub 210 is discharged by a ground system comprising the electrical coupling of the surfaces 221 and 222, the shaft 214 and the frame 233.

Hereinbefore the invention has been described for embodiments having magnetic heads and magnetic information carriers. It is however to be noted that the invention can be used with the same advantages in an apparatus with an optical head for reading and/or writing information from/on an optical tape or an optical disc.

We claim:

1. An apparatus for recording and/or reproducing information on an information carrier, comprising:

a read and/or write head for reading and/or writing information on the information carrier;

a rotatable member (10; 110; 210) for rotation about an axis of rotation thereof to thereby move the head and the information carrier relative to each other;

a bearing for supporting said rotatable member relative to a frame (2; 13; 133; 233) of said apparatus so as to allow rotation of the rotatable member around said axis of rotation; and grounding means comprising an electrical coupling (21, 22; 121, 122; 221, 222) between the rotatable member and said frame to limit static charging of the rotatable member;

the bearing having adjoining surfaces (21, 22; 121, 122; 221, 222) which cooperate to support the rotatable member in the axial direction relative to said frame; characterized in that during rotation of the rotatable member the surfaces of said bearing are in contact with each other;

at least one of the bearing surfaces comprises tungsten carbide; and said electrical coupling is formed by said contact between the surfaces of said bearing.

2. An apparatus as claimed in claim 1, characterised in that the at least one bearing surface comprises an alloy of tungsten carbide and cobalt.

3. An apparatus as claimed in claim 2, characterised in that the at least one bearing surface comprises an alloy of 90–97% tungsten carbide and 10–3% cobalt.

4. An apparatus as claimed in claim 1, characterised in that the at least one bearing surface is formed by cemented tungsten carbide grains with an average diameter in the range of 0.3 to 1.2 micrometer.

5. An apparatus as claimed in claim 1, characterised in that one bearing surface is substantially flat and the adjoining bearing surface is convex and rotationally symmetric around said axis of rotation.

6. An apparatus as claimed in claim 1, characterised in that said bearing is a hydrodynamic fluid bearing (25, 26) for supporting the rotatable member in a radial direction tranverse to said axis of rotation.

7. An apparatus as claimed in claim 1, characterised in that the at least one bearing surface which comprises tungsten carbide has a surface roughness Ra between 0.008 and 0.05 micrometer.

8. An apparatus as claimed claim 1, characterised in that the rotatable member is a rotary drum for helical scanning of a tape-shaped information carrier.

9. An apparatus as claimed in claim 1, characterised in that the rotatable member is a capstan for driving a tape-shaped information carrier.

10. An apparatus as claimed in claim 1, characterised in that the rotatable member is a hub for driving a disc-shaped information carrier.

* * * * *